J. TURNER.
RAILROAD COUPLING.

No. 9,144. Patented July 20, 1852.

UNITED STATES PATENT OFFICE.

JAMES TURNER, OF EAST NASSAU, NEW YORK.

RAILROAD-CAR COUPLING.

Specification of Letters Patent No. 9,144, dated July 20, 1852.

*To all whom it may concern:*

Be it known that I, JAMES TURNER, of East Nassau, in the county of Rensselaer and State of New York, have invented certain new and useful Improvements in Railroad-Car Couplings; and I do hereby declare that the following is a full, clear, and exact description of the same, reference being had to the accompanying drawings, forming part of this specification, in which—

Figure 1:
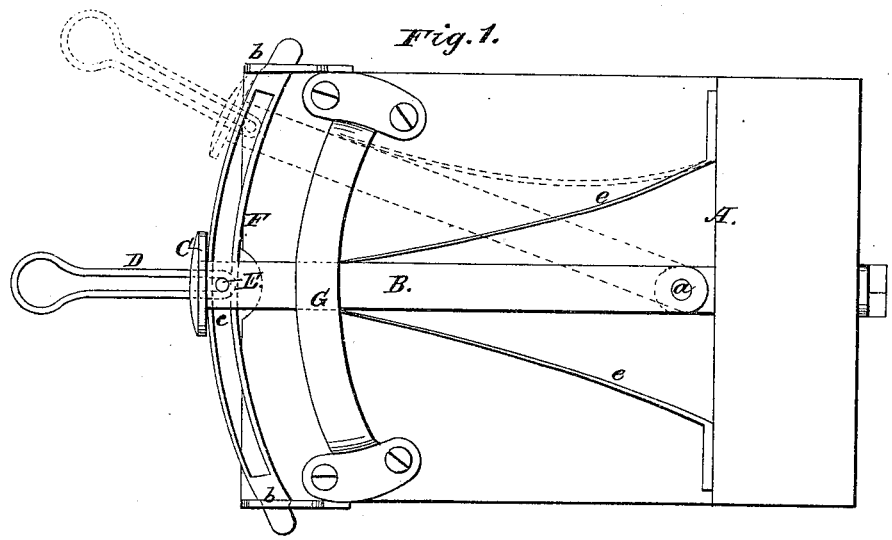
Figure 2:
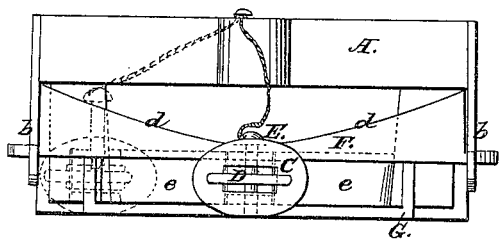
Figure 3:
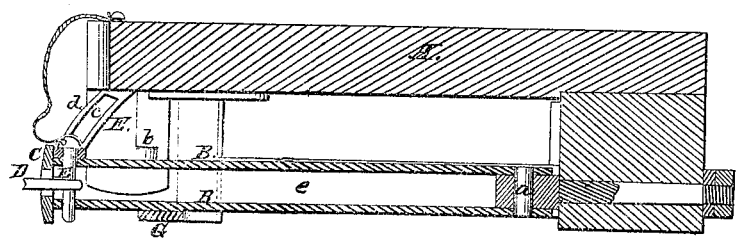

Figure 1, is an inverted plan of one end of a car having my improvements attached, Fig. 2, is a front view, and Fig. 3, is a longitudinal vertical section of the same.

Similar letters of reference indicate corresponding parts in each of the several figures.

These improvements are chiefly intended to cause the locomotive or any car of a train, that may by accidental means get off the track, immediately to detach itself from the rest of the train, by which means it will be preserved from any material injury itself and likewise be prevented from drawing others off the track or injuring them. The said improvements also accomplish another object, viz, that of allowing a close connection to be made between the cars, and the buffer springs to be dispensed with. They consist simply in connecting the inner end of the traction bars to which the buffers are attached to the car in such a manner as to allow the buffer to move sidewise, and in attaching to the ends of the car a transverse bar whose upper side inclines upward from the middle toward the sides of the car; upon this bar the head of the coupling pin rests—the form of coupling employed being the common link and pin coupling. When the engine or a car gets off the track it drags the buffers of the next cars sidewise and the coupling pins being also moved sidewise are raised by their heads passing up the inclines on the transverse bar, until they are drawn from the links, and the detached engine or car, is uncoupled.

To enable those skilled in the art to make and use my invention I will proceed to describe its construction and operation.

A, represents part of the platform or floor frame of a car.

B, B, are the traction bars which instead of being rigidly attached to the car as is commonly the case are jointed by a pin $a$, and have springs $e$, $e$, which are secured to the car, bearing on each side to keep the buffer in line with the middle of the car.

C, is the buffer.

D, is the coupling link, and E, one of the coupling pins which passes through the traction bars at the back of the buffer and through the link in the common way. G, is a guide for the traction bars.

F, is the transverse incline bar, which is secured to the car close behind the buffer and close above the upper traction bar. Its form is that of an arc described from $a$. Its ends are fitted in slotted cheeks $b$, $b$, attached to the sides of the car or may be otherwise secured. There is a vertical slot $c$, extending nearly from end to end of it (see Figs. 1, and 3,) and through this slot the coupling pin passes, its head resting on the bar on the two sides of the slot. The inclined form of the upper side of the bar is shown best in Fig. 2, by referring to which it will be seen that its depth is very slight in the middle but that it increases in depth toward the ends. This increase in its depth is all on the upper side which gives it two inclines $d$, $d$.

The manner in which the pin is drawn will be readily understood by referring to those parts of Figs. 1, and 2, which are in red; the movement of the buffer and traction rod is best shown in Fig. 1, where the red lines show it moved sidewise; and the drawing of the pin is shown in Fig. 2, where the red lines show the buffer moved toward the side of the car, and the point of the pin raised above the link by its head passing up the incline $d$.

It has long been a desideratum to make a close connection or to bring the buffers close together and at the same time to dispense with the bumping spring, but this is impossible where the buffer and traction bars are stationary, as in turning curves the cramping of the buffers could not be prevented. By jointing the bars and applying the side springs $e$, $e$, the close connection can be made and the bumping spring dispensed with, as the bars and buffers will yield sidewise and the springs always return them in line with the center of the car.

The incline bar F, may be employed either with or without the bumping spring, and in combination with any movement of the buffer and traction bars sidewise, and may be straight or curved horizontally to suit the movement of the pin. The same arrangement may be applied to the locomotive though I don't consider it to be absolutely necessary.

What I claim as my invention, and desire to secure by Letters Patent, is—

The transverse incline bar F, in combination with the coupling pin E, and link D, the pin resting on the incline bar, and being raised clear of the link by passing up the inclines on the said bar as it (the pin) moves sidewise substantially as herein described.

JAMES TURNER.

Witnesses:
   G. W. PEATCHAM,
   WARREN G. BROWN.